United States Patent [19]

Jaeger

[11] 3,818,058

[45] June 18, 1974

[54] AROMATIC PERFLUOROALKYLALKYLMONOCAR-BOXYLIC ACID ESTERS

[75] Inventor: Horst Jaeger, Bettingen, Switzerland

[73] Assignee: Ciba-Geigy, Basel, Switzerland

[22] Filed: Feb. 3, 1971

[21] Appl. No.: 112,475

[30] Foreign Application Priority Data
Feb. 9, 1970   Switzerland.......................... 1826/70

[52] U.S. Cl.............. 260/408, 260/468 J, 260/487,
117/121, 117/124, 117/127, 117/138.8 F,
117/138.8 M, 117/138.8 UA, 117/143 R,
117/141, 117/144, 117/154
[51] Int. Cl...................... C07c 69/62, D06m 13/20
[58] Field of Search.................. 260/408, 487, 468 J

[56] References Cited
UNITED STATES PATENTS
2,856,388   10/1958   Barnhart et al.................... 260/78.4
3,340,295    9/1967   Wheeler et al. .................... 260/486
3,586,526    6/1971   Aranoff et al. ................... 117/93.31

FOREIGN PATENTS OR APPLICATIONS
1,157,320   7/1969   Great Britain

Primary Examiner—Elbert L. Roberts
Assistant Examiner—Diana G. Rivers
Attorney, Agent, or Firm—Joseph G. Kolodny; Stanley A. Marcus; Prabodh I. Almaula

[57] ABSTRACT

Aromatic perfluoroalkylalkylmonocarboxylic acid esters are provided which are derived from aromatic epoxides. These esters contain at least one perfluoroalkyl radical with four to 14 carbon atoms which is bonded over an alkylene bridge with one to 10 carbon atoms to the carboxyl group, which carboxyl group is esterified with at least one aromatic epoxide, which epoxide contains at most two epoxide groups per molecule. The hydroxyl groups produced in the esterifying process are optionally etherified or esterified with an alkanol or an alkyl carboxylic acid.

The perfluoroalkylalkylmonocarboxylic acid esters are used for treating porous or non-porous substrates, preferably to achieve oleophobic finishes on fibrous mterials, such as textiles and paper.

8 Claims, No Drawings

AROMATIC PERFLUOROALKYLALKYLMONOCARBOXYLIC ACID

The subject of the invention are perfluoroalkylalkyl-monocarboxylic acid esters which contain (a) at least one perfluoroalkyl radical with four to 14 carbon atoms, which is bonded via an alkylene group with one to 10 carbon atoms to a carboxyl group, which is bonded in an ester-like manner to (b) an acyclic, aliphatic radical which is substituted in the 2-position to the ester bridge by an optionally etherified or esterified hydroxyl group, this radical being bonded, directly or via an ether bridge, to (c) an aromatic radical, which is optionally also linked directly or via an ether bridge to a radical like (b), which is in turn bonded via an ester bridge to a radical like (a). The alkylene group, via which the perfluoroalkyl radical is bonded to the carboxyl group, can be acyclic — branched or unbranched — or cyclic. The acyclic radicals contain one to 10 carbon atoms, whilst the cycloalkylene radicals possess five or six ring carbon atoms. The ethylene, n-butylene, n-decylene, isopropylene or cyclohexylene radical may be mentioned as examples.

Preferably, the perfluoroalkylalkylmonocarboxylic acid esters correspond to the formula (1)
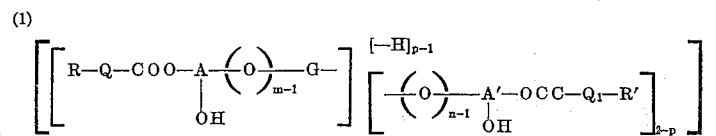

wherein R and R' each denote a perfluoroalkyl radical with four to 14 carbon atoms, Q and $Q_1$ each denote an acyclic alkylene radical with one to 10 carbon atoms or a cycloalkylene radical with five or six ring carbon atoms, A and A' each denote an alkyl radical, G denotes an aromatic radical and m, n and p each denote 1 or 2, with the hydroxyl group being in the 2-position to the R—COO— or R'—COO— group.

Further valuable compounds are the perfluoroalkylalkylmonocarboxylic acid esters of the formula (2)
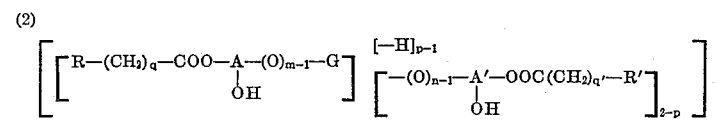

wherein the symbols R, R', A, A', G, m, n and p have the abovementioned meaning and q and q' each denote an integer having a value of 1 to 10, preferably 2 to 6.

Thus, where p is 1, the compounds of the Formula 1 are aromatic esters with two perfluoroalkylalkyl-monocarboxylic acid esters, and when p is 2, the esters only possess one perfluoroalkylalkylmonocarboxylic acid radical.

Particular interest attaches to perfluoroalkylalkyl-monocarboxylic acid esters of the formula (3)
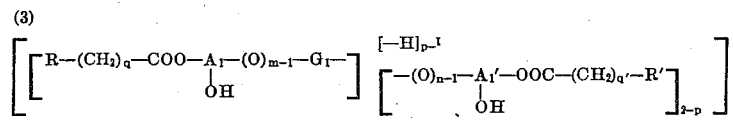

wherein $A_1$ and $A_1'$ each denote an alkyl radical with two to three carbon atoms and $G_1$ denotes a benzene or bisphenylalkyl radical which is optionally substituted further, and R, R', m, n, p, q and q' have the indicated meaning, the hydroxyl group being in the 2-position to the R—COO— or R'—COO— group.

Suitable perfluoroalkylalkylmonocarboxylic acid esters of the Formula 3, wherein p equals 2, correspond to the formula (4)
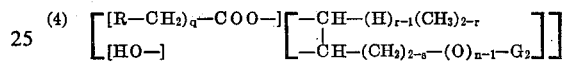

wherein $G_2$ represents a benzene radical which is optionally substituted further, r and s are each 1 or 2, the sum r + s being at least 3, and R, n and q have the indicated meaning.

Amongst these perfluoroalkylalkylmonocarboxylic acid esters, those of the formula (5)
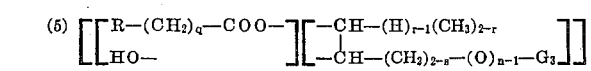

wherein $G_3$ represents a phenyl or alkylphenyl radical and R, n, q, r and s have the indicated meaning, are preferred.

The perfluoroalkylalkylmonocarboxylic acid esters of the Formula 3, in which p equals 1, correspond above all to the formula (6)
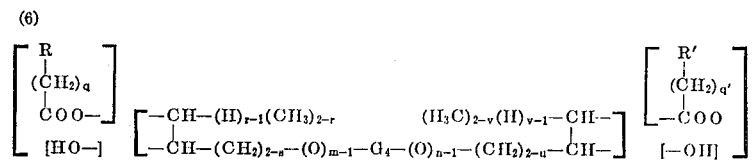

wherein $G_4$ represents a bisphenylalkyl radical which is optionally substituted further, r, s, u, v, m and n are each 1 or 2, with the sum of r + s and u + v being in each case at least 3, and R, q and q' have the indicated meaning.

Here, a preferred position is occupied by perfluoroalkylaklylmonocarboxylic acid esters of the formula (7)

$$\left[\begin{array}{c}R\\(CH_2)_q\\COO-\\{[HO-]}\end{array}\right]\left[\left(\begin{array}{c}O-\\CH_2\\-CH\\-CH\end{array}\bigcirc\begin{array}{c}CH_3\\|\\C\\|\\CH_3\end{array}\bigcirc\begin{array}{c}O-CH_2\\CH-\\(-OH)\\CH_2-\end{array}\right)_z\left(\begin{array}{c}-O-\bigcirc\begin{array}{c}CH_3\\|\\C\\|\\CH_3\end{array}\bigcirc\begin{array}{c}O\\H_2C\\HC-\\H_2C-\end{array}\right)\left[\begin{array}{c}R\\(CH_2)_{q'}\\COO\\{[-OH]}\end{array}\right]\right]$$

wherein z denotes an average number of value 0 to 0.65, and R, q and q' have the indicated meaning.

The perfluoroalkyl radical of the perfluoroalkylalkylmonocarboxylic acid esters according to the invention preferably contains 5 to 11, or especially 7 to 9, carbon atoms. The perfluoroalkyl radical can be either branched or unbranched. A branched radical can for example be an iso-perfluoroalkyl radical of the formula (8)

$$\begin{array}{c}F_3C\\ \quad\diagdown\\ \quad\quad CF-(CF_2)_w-\\ \quad\diagup\\F_3C\end{array}$$

wherein w represents an integer having a value of 1 to 11. However, n-perfluoroalkyl radicals are preferred. A further possible perfluoroalkyl radical is also a so-called ω-H-perfluoroalkyl radical, which possesses a hydrogen atom in the terminal position.

The perfluoroalkylalkylmonocarboxylic acid esters according to the invention are always isomer mixtures, in that they are manufactured from epoxides and on opening the epoxide ring the esterification with the perfluoroalkylalkylmonocarboxylic acid can take place at either of the adjacent carbon atoms of the epoxide group.

The perfluoroalkylalkylmonocarboxylic acid esters according to the invention are manufactured according to methods which are in themselves known, in that (1) at least one perfluoroalkylalkylmonocarboxylic acid which contains a perfluoroalkyl radical with four to 14 carbon atoms which is bonded via an alkylene bridge with one to 10 carbon atoms to a carboxyl group, is reacted with (2) at least one aromatic epoxide which contains at most two epoxide groups per molecule, and (3) thereafter the hydroxyl groups produced in this reaction are optionally etherified or esterified with an alkanol or an alkylcarboxylic acid.

The perfluoroalkylalkylmonocarboxylic acids used as starting materials are well known to the art and are disclosed, for example, in U.S. Pat. Nos. 2,951,051; 3,145,222 and 3,171,861.

Perfluoroalkylalkylmonocarboxylic acid esters of the Formula 1 are obtained by reaction of the component 1 of a perfluoroalkylalkylmonocarboxylic acid of the formula 9. R — Q — COOH or
10. R' — $Q_1$ — COOH with (2) an epoxide of the formula (11)

$$\left[[O=A-(O)_{m-1}G]\begin{array}{c}[-H]_{p-1}\\ {[-(O)_{n-1}A'=O]_{2-p}}\end{array}\right]$$

when A, A', G, Q, $Q_1$, R, R', m, n and p have the indicated meaning. The epoxides employed as starting materials are well known to the art and are disclosed, for example, in U.S. Pat. Nos. 2,221,771; 2,221,818; 2,336,093; 2,343,053 and 2,467,171.

The epoxides of the formula (11) are as a rule liquid at room temperature, that is to say at 15° to 25°C, and are for example derived from phenols or polyphenols, such as resorcinol, hydroquinone, phenol-formaldehyde condensation products of the type of the resols or novolacs, hydroxynaphthalenes or hydroxyanthracenes.

Perfluoroalkylalkylmonocarboxylic acid esters of the Formulae 2 and 3 are therefore obtained if, as component (1), a perfluoroalkylalkylmonocarboxylic acid of the formula 12. R — $(CH_2)_q$ — COOH or
13. R' — $(CH_2)_q$ — COOH is used, and as component 2 an epoxide of the formula (14)

$$\left[[O=A_1-(O)_{m-1}-G_1]\begin{array}{c}[-H]\\ {[-(O)_{n-1}-A_1'=O]_{2-p}}\end{array}\right]$$

is used, when $A_1$, $A_1'$, $G_1$, R, R', m, n and p have the indicated meaning and q and q' each represent an integer having a value of 1 to 10.

If monoepoxides of the formula (15)

$$O{\diagup\atop\diagdown}\begin{array}{c}CH-(H)_{r-1}(CH_3)_{2-r}\\ |\\ CH-(CH_2)_{2-s}-(O)_{m-1}-G_2\end{array}$$

or (16)

$$O{\diagup\atop\diagdown}\begin{array}{c}CH-(H)_{r-1}(CH_3)_{2-r}\\ |\\ CH-(CH_2)_{2-S}-(O)_{m-1}-G_3\end{array}$$

wherein $G_2$, $G_3$, m, r and s have the indicated meaning, are used, the perfluoroalkylalkylmonocarboxylic acid esters of the Formulae 4 or 5 are obtained.

Suitable monoepoxides of the Formula 14 or 15 correspond, for example, to the formulae (17.1) $(H_3C)_3C-\bigcirc-O-CH_2-HC\underset{O}{\overset{\diagdown\diagup}{—}}CH_2$ (17.2) $\bigcirc-\bigcirc-O-CH_2-HC\underset{O}{\overset{\diagdown\diagup}{—}}CH_2$ (17.3) $\underset{}{\bigcirc}\overset{CH_3}{\underset{|}{}}-O-CH_2-HC\underset{O}{\overset{\diagdown\diagup}{—}}CH_2$ (17.4) $\bigcirc-HC\underset{O}{\overset{\diagdown\diagup}{—}}CH_2$ In the case of the preferred use of diepoxides of the formula (18)

$$O{\diagup\atop\diagdown}\begin{array}{cc}CH-(H)_{r-1}(CH_3)_{2-r} & (H_3C)_{2-v}(H)_{v-1}-HC\\ | & |\\ CH-(CH_2)_{2-s}-(O)_{m-1}-G_4-(O)_{n-1}-(CH_2)_{2-u}-HC\end{array}{\diagdown\atop\diagup}O$$

or
(19)

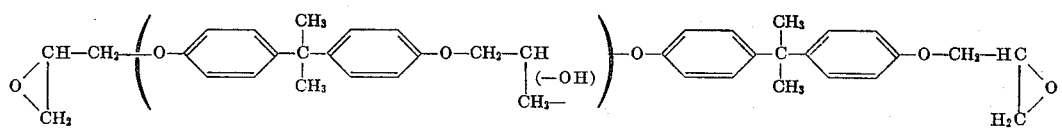

wherein $G_4$, m, n, r, s, u, v and z have the indicated meaning, the perfluoroalkylalkylmonocarboxylic acid esters of the Formula 6 or 7 are obtained.

Amongst the epoxides of the formula 18, epoxides of 2,2-bis-(4'-hydroxyphenyl)-propane, which possess an epoxide content of 3.8 to 5.8 epoxide group equivalents/kg, but preferably at least 5 epoxide group equivalents/kg, are particularly preferred. Such diepoxides correspond, for example, to the formula (19) and are obtained by reaction of epichlorohydrin with 2,2-bis-(4'-hydroxyphenyl)-propane.

Instead of the epoxides, the corresponding diols can also be used for the manufacture of the compounds according to the invention.

The perfluoroalkylalkylmonocarboxylic acids used for the manufacture of the perfluoro compounds according to the invention preferably contain five to 11, or especially seven to nine, carbon atoms in the perfluoroalkyl radical.

The perfluoroalkyl radical is bonded to the carboxyl group via an alkylene bridge member with 1 to 10, preferably 2 to 6, carbon atoms.

The reaction of the Components 1 and 2 preferably takes place in an organic solvent, such as, for example, ethyl acetate, and appropriately in the presence of a catalyst, such as for example anhydrous sodium acetate. Preferably, the reaction is carried out at a temperature of 20° to 70°C, especially at 30° to 50°C.

Depending on the nature of the reactants and on the reaction conditions, the reaction requires 1 to 24 hours; it is however in general complete after 4 to 8 hours.

As a result of the presence of free hydroxyl groups, the perfluoroalkylalkylmonocarboxylic acid esters according to the invention react with compounds which contain several functional groups capable of reaction with hydroxyl groups, such as 1,2-epoxide groups, isocyanate groups, acrylic groups, methylol groups, methylol groups etherified with lower alcohols, aldehyde groups, easily hydrolysable ester groups and the like. Such polyfunctional compounds are therefore suitable for use as crosslinking components or curing components for the perfluoroalkylalkylmonocarboxylic acid esters, containing hydroxyl groups, according to the invention.

As such crosslinking components there may especially be mentioned: epoxide compounds, namely polyglycidyl ethers, such as butanediol diglycidyl ether and diglycidyl ether, diisocyantes and polyisocyanates, such as o-, m- and p-phenylenediisocyate, toluylene-2,4-diisocyante and 1,5-naphthylenediisocyanate; acrylic compounds such as methylenebis-acrylamide and symmetrical triacrylperhydrotriazine; poly-(2,3-dihydro-1,4-pyranyl) compounds such as (2,3-dihydro-1',4'-pyran-2'-yl)-methyl ester; aldehydes, such as formaldehyde or glyoxal, and soluble phenol-formaldehyde condensation products, such as novolacs or resols. Preferably, aminoplasts which are soluble in water or in organic solvents are used as crosslinking components.

Possible crosslinking components of this nature are formaldehyde condensation products of urea, thiourea, guanidine, acetylenediurea and dicyandiamide, and also of aminotriazines, such as melamine, or of guanamines, such as acetoguanamine, benzoguanamine, tetrahydrobenzoguanamine or formoguanamine, as well as their ethers with alcohols, such as methyl, propyl, allyl, butyl, amyl, hexyl, cyclohexyl, benzyl, lauryl, stearyl, oleyl or abietyl alcohol. In addition to the ether radicals the condensation products can also contain radicals of higher-molecular acids, such as for example stearic acid.

Particularly good technical results in the field of textile finishing are obtained when using water-soluble condensation products of formaldehyde and melamine or especially with an esterification product or etherification product of hexamethylolmelamine-methyl-ether and stearic acid or stearyl alcohol as crosslinking components.

Perfluoroalkylalkylmonocarboxylic acid esters can also be used as a mixture with polymers not containing flourine. Very suitable polymers not containing fluorine are in this case, for example, the homopolymers of acrylic or methacrylic acid esters, such as poly(ethyl acrylate) or copolymers of acrylic or methacrylic acid esters with methylolacrylamide or methylolmethacrylamide.

Because of their reactive groupings, the perfluoroalkylalkylmonocarboxylic acid esters according to the invention can be used for the treatment of porous and nonporous substrates, preferably for producing oleophobic finishes thereof, the esters being incorporated into the material in question or above all being applied to its surface. By porous substrates there are to be understood leather or preferably fibre materials such as textiles and paper, whilst possible non-porous materials are glass and above all surfaces of metals and especially of plastics.

The finishing of the substrate with the perfluoroalkylalkylmonocarboxylic acid esters according to the invention can be carried out in a separate process stage, but also in the same process stage as the application of further finishing agents, for example together with known agents for conferring hydrophobic properties, such as paraffin emulsions, or solutions or emulsions of fatty acid condensation products, for example with aminoplast precondensates.

Furthermore, a so-called "soil release" and "antisoiling" effect can also be achieved with the perfluoro compounds according to the invention, especially on cotton.

Simultaneously with the effect of imparting oleophobic properties perfluoro compounds containing hydroxyl groups also display hydrophilic properties. For imparting oleophobic properties, the substrates can be treated either with solutions or with dispersions or emulsions of the perfluoro compounds. The perfluoroalkylalkylmonocarboxylic acid esters can for example also be applied to the textile material as a solution in an organic solvent and can be thermally fixed to the fabric after evaporation of the solvent.

Textile materials are of particular interest for finishing by means of the perfluoroalkylalkylmonocarboxylic acid esters according to the invention. Textile materials for example include those of native or regenerated cellulose, such as cotton, linen or rayon, staple viscose or cellulose acetate. However, textiles of wool, synthetic polyamides, polyesters or polyacrylonitrile can also be used. Mixed woven fabrics or mixed knitted fabrics of cotton-polyester fibres can also be finished advantageously. The textiles can in these cases be in the form of filaments, fibres or flocks, but preferably of woven fabrics or knitted fabrics.

Preparations which contain the perfluoro compounds according to the invention can be applied to the substrate in the customary manner which is in itself known. Woven fabrics can for example be impregnated by the exhaustion process or on a padder which is charged with the preparation at room temperature. The impregnated material is thereafter dried at 60° to 120°C and is subsequently optionally still subjected to a heat treatment at above 100°C, for example at 120° to 200°C.

The textiles thus treated show an oil-repellent effect and where the preparation also contains an agent for imparting hydrophobic properties, this effect is coupled with a water-repellent effect.

EXAMPLE 1

14.1 g of styrene oxide together with 22.1 g of 2,2,3,3-H-pentadecafluorodecylic acid are dissolved at room temperature in 100 ml of ethyl acetate, with the addition of 1 g of anhydrous sodium acetate. The temperature rises to 29°C. The reaction temperature is kept constant at 40°C and after 18 hours' reaction the epoxide content is 0%. The solution is concentrated in vacuo at 40°C. The residue is taken up in 100 ml of diethyl ether and washed three times with 20 ml of water, and yields a light-coloured, liquid phase. Weight: 22.1 g = 78.69% of theory.

The structure is confirmed by recording a mass spectrum, in that this shows a molecular weight of 562, which corresponds to a product of the formula (20)

$$\underset{CH_2-}{\overset{-CH-}{\bigcirc}} \begin{bmatrix} -OOC-CH_2CH_2(CF_2)_6-CF_3 \\ -OH \end{bmatrix}$$

EXAMPLE 2

17 g of the epoxide of the Formula 19 (Z = 0) and 49.2 g of a perfluoroalkylalkylmonocarboxylic acid [1] are dissolved in 200 ml of ethyl acetate together with 2 g of sodium acetate (anhydrous). The reaction mixture is kept for 7 hours at 80°C. Thereafter the ethyl acetate is removed in vacuo, and the residue is taken up in 200 ml of ether and washed three times with 20 ml of water. The ether solution is then dried over sodium sulphate, and the ether is removed in vacuo at 50°C. A titration for epoxide is negative. 36 g of a white, solid substance are obtained, corresponding to a yield of 54.5% of theory.

[1] The perfluoroalkylalkylmonocarboxylic acid used has the following composition, according to the gas chromatogram and the mass spectrum:

| | |
|---|---|
| 16% of $CF_3(CF_2)_9(C_2H_4)COOH$ | M 592 |
| 3% of $CF_3(CF_2)_{11}(C_2H_4)COOH$ | M 692 |
| 2% of $CF_3(CF_2)_5(C_4H_8)COOH$ | M 420 |
| 32% of $CF_3(CF_2)_7(C_4H_8)COOH$ | M 520 |
| 34% of $CF_3(CF_2)_9(C_4H_8)COOH$ | M 620 |
| 1% of $CF_3(CF_2)_5(C_6H_{12})COOH$ | M 448 |
| 11% of $CF_3(CF_2)_7(C_6H_{12})COOH$ | M 548 |

EXAMPLE 3

4.62 g of styrene oxide together with 20.0 g of a perfluoroalkylalkylmonocarboxylic acid [1] and 2.0 g of sodium acetate (anhydrous) are dissolved in 200 ml of ethyl acetate. After 6 hours at 80°C, the ethyl acetate is removed in vacuo, the residue is taken up in 200 ml of diethyl ether, the solution is washed three times with 20 ml of water and dried, and the ether is removed in vacuo. 23.1 g of a white, waxy substance are obtained (yield: 93.9% of theory).

[1] The perfluoroalkylalkylmonocarboxylic acid used has the same composition as in Example 2.

The structure is confirmed by recording a mass spectrum, in that this shows mass numbers of 712, 640 and 740, which corresponds to a product of the formula (21)

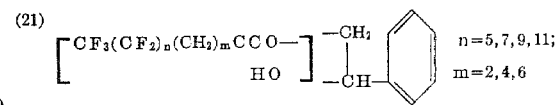

$n = 5, 7, 9, 11;$
$m = 2, 4, 6$

Because of the low volatility of the sample, only a part of the peaks can be detected.

EXAMPLE 4

12.0 g of styrene oxide together with 60.4 g of perfluoroalkylundecylenic acid [1] and 2 g of sodium acetate are dissolved in 400 ml of ethyl acetate. The reaction is carried out in accordance with the process described in Example 3. Yield: 52.9 g = 73.06% of theory, of a waxy substance.

The structure is confirmed by recording a mass spectrum, in that this shows mass numbers of 624, 724 and 824, which corresponds to the following formula:

(22)

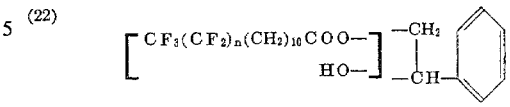

[1] The perfluoroalkylundecylene-carboxylic acid used has the following composition:

| | |
|---|---|
| 26.40% of $C_6F_{13}(CH_2)_{10}COOH$ | M 504 |
| 48.7% of $C_8F_{17}(CH_2)_{10}COOH$ | M 604 |
| 23.05% of $C_{10}F_{21}(CH_2)_{10}COOH$ | M 704 |

[1] The perfluoroalkylcyclohexylcarboxylic acid used has the following composition

| | | |
|---|---|---|
| 28.1% of | $C_6F_{13}$ — ⬡ — COOH | M 446 |
| 47.8% of | $C_8F_{17}$ — ⬡ — COOH | M 546 |
| 18.5% of | $C_{10}F_{21}$ — ⬡ — COOH | M 646 |

EXAMPLE 5

12.0 g of styrene oxide together with 54.6 g of a perfluoroalkylcyclohexylcarboxylic acid [1] and 2 g of sodium acetate are dissolved in 400 ml of ethyl acetate and the reaction is carried out in accordance with the process described in Example 3. Yield: 43.7 g = 65.61% of theory, of a viscous substance.

The structure is confirmed by recording a mass spectrum, in that this shows mass numbers of 566, 666 and 766, which corresponds to the following formula:

(23) 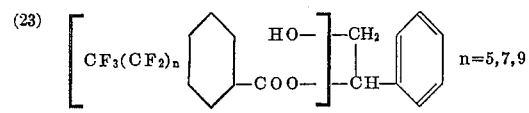 n=5,7,9

EXAMPLE 6

2 g of the end product according to Example 1 are dissolved in 10 ml of ethyl acetate. 0.1 or 0.2 g of citric acid, 0.1 or 0.2 g of $MgCl_2$ and 0.5 g of water are additionally weighed out into this solution.

Woven pieces of cotton, cotton-polyester synthetic polyamide, polyester and wool gabardine are successively dipped into this liquor and thus impregnated with the perfluoro compound.

A piece of filter paper is also impregnated in this way. The fabric sample and paper sample are thereafter dried for 10 minutes at 140°C.

This assessment of the oil-repellent effect is carried out according to the so-called "3 M oil repellency test" (Crajeck and Petersen, *Textile Research Journal* 32, 320 to 331, 1960) using heptane-Nujol mixtures.

In the assessment, 150 denotes the best achievable rating.

The results of this test are summarised in the table below.

| Substrate | as such | after 1 × trichloroethylene |
|---|---|---|
| Cotton | 60 | 60 |
| Cotton/polyester | 80 | 80 |
| Polyester | 70 | 80 |
| Polyamide | 80 | 80 |
| Wool gabardine | 60 | 70 |
| Paper | 70 | — |

The fabric finished with the product according to Example 1 is hydrophilic and oleophobic.

EXAMPLE 7

The following liquors are prepared with the substances from Examples 2 to 5: (Concentrations in g/l)

| Constituents | Liquor | | | | | | | | |
|---|---|---|---|---|---|---|---|---|---|
| Product from | A | B | C | D | E | F | G | H | I |
| Example 2 | 10 | 20 | 20 | 40 | 30 | | | | |
| Example 3 | | | | | | 10 | 20 | | |
| Example 4 | | | | | | | | 20 | |
| Example 5 | | | | | | | | | 20 |
| X | 100 | 100 | | | | | | | |
| XX | | | 30 | 30 | | | | | |
| $MgCl_2$ | 10 | 10 | | | | | | | |
| Chloroacetic acid | | | 3 | 3 | | 3 | 3 | 3 | 3 |
| Water | 500 | 500 | | | 500 | | | | |
| Ethanol | 500 | 500 | 1000 | | 500 | 1000 | 1000 | 1000 | |
| Dioxane | | | | 1000 | | | | | 1000 |
| XXX | | | | | 3 | | | | |

X: 50% strength solution of 1 mol of hexamethylolmelaminehexamethyl ether and 1 mol of dimethylolethyleneurea
XX: Hexamethylolmelamine-pentamethyl-ether
XXX: Isobutan-(2)-ol-(3)-amine hydrochloride.

Woven pieces of cotton and, in part, of cotton-polyester are successively dipped into these liquors and thus impregnated with the perfluoro compound. Thereafter the pieces of fabric are dried for 5 minutes at 100°C in vacuo.

The assessment of the oil-repellent effect is carried out as indicated in Example 6. The test is in each case carried out after 1, 5 and 10 SNV-3 washes. (SNV-3 wash: machine wash for 30 minutes at 60°C, using a liquor ratio of 1:50, in a washing liquor which per litre contains 5 g of soap and 2 g of anhydrous sodium carbonate).

The cotton-polyester fabrics which have been finished with liquors A to D and F and G are additionally also tested for their soil-release properties. For this, the test specimens are spotted with Nujol. The spots are applied before the first SNV-3 wash and then assessed with ratings 1 to 5 after the 1st, 5th and 10th SNV-3 wash. The rating 1 denotes "not washed out," and the rating 5 denotes "completely washed out." For the soil release test, rating 5 is the best rating.

Results

| Liquor | A | B | C | D | E | F | G | H | I |
|---|---|---|---|---|---|---|---|---|---|
| Cotton, as such | 100 | 110 | 100 | 100 | 110 | 100 | 100 | 100 | 100 |
| 1 × SNV-3 | 70 | 120 | 70 | 100 | 70 | 50 | 50 | 70 | 70 |
| 5 × SNV-3 | | 100 | — | 60 | 50 | — | — | — | — |
| 10 × SNV-3 | | 100 | — | — | — | — | — | — | — |
| Cotton/polyester, as such | — | — | 100 | — | — | 100 | 100 | 100 | 90 |
| 1 × SNV-3 | | | 70 | | 50 | 70 | 60 | 60 | |
| 5 × SNV-3 | | | 60 | | | — | — | — | — |
| 10 × SNV-3 | | | — | | | | | | |

Results — Continued

| Liquor | A | B | C | D | E | F | G | H | I |
|---|---|---|---|---|---|---|---|---|---|
| Soil release (Nujol) | | | | | | | | | |
| Cotton/polyester | | | | | | | | | |
| 1 × SNV-3 | 3.5 | 4 | 4.5 | 4.5 | | 2.5 | 3.0 | | |
| 5 × SNV-3 | 2.5 | 3 | 4.3 | 4.3 | | 2.5 | 2.0 | | |
| 10 × SNV-3 | 2.5 | 3 | 2.5 | 2.5 | | 2.5 | 2.0 | | |

The finishes are hydrophilic.

What we claim is:

1. Perfluoroalkylalkylmonocarboxylic acid esters characterized in that they correspond to the formula

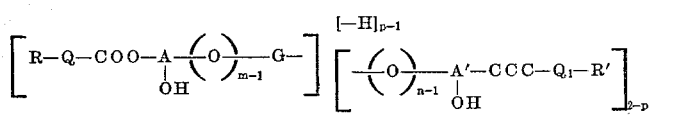

wherein R and R' each denote a perfluoroalkyl radical with four to 14 carbon atoms, Q and $Q_1$ each denote an acyclic alkylene radical with one to 10 carbon atoms or

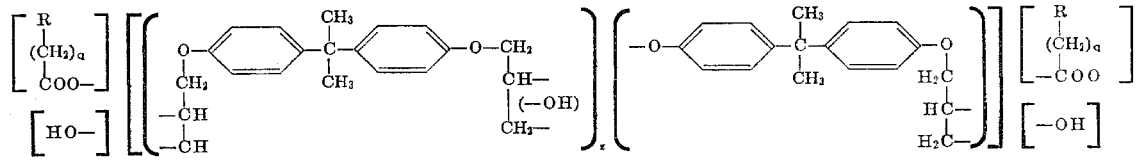

a cycloalkylene radical with five to six ring carbon atoms, A and A' each denote an alkylene radical with two or three carbon atoms, G denotes a benzene or 2,2-bisphenylalkyl radical and m, n and p each denote 1 or 2, with the hydroxyl group being in the 2-position to the R—Q—COO — or R'—$Q_1$ COO group.

2. Perfluoroalkylalkylmonocarboxylic acid esters according to claim 1, characterised in that they correspond to the formula

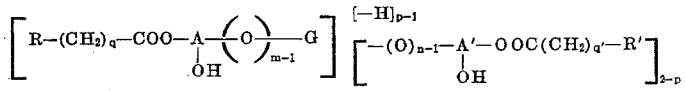

wherein the symbols R, R', A, A', G, m, n and p have the abovementioned meaning and q and q' each denote an integer having a value of 1 to 10.

3. Perfluoroalkylalkylmonocarboxylic acid esters according to claim 2, characterised in that they correspond to the formula

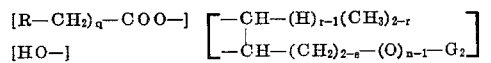

wherein $G_2$ represents a benzene radical, r and s are each 1 or 2, with the sum r+s being at least 3, and R, n and q have the meaning indicated in claim 2.

4. Perfluoroalkylalkylmonocarboxylic acid esters according to claim 2, characterised in that they correspond to the formula

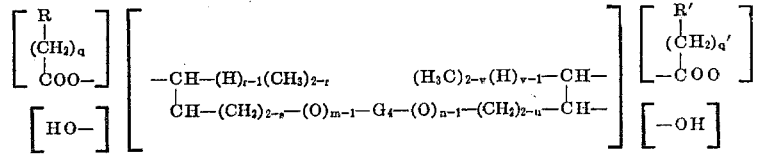

wherein $G_4$ represents a bisphenylalkyl radical, r, s, u, v, m and n are each 1 or 2, with the sum of r + s, and u + v, being in each case at least 3, and R, $R^1$, q and q' have the meaning indicated in claim 2.

5. Perfluoroalkylalkylmonocarboxylic acid esters according to claim 4, characterised in that they correspond to the formula

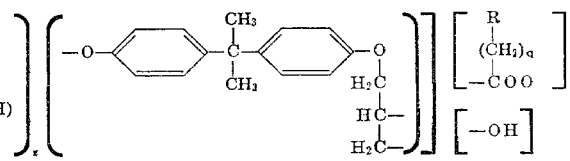

wherein z denotes an average number having a value of 0 to 0.65 and R and q have the meaning indicated in claim 4.

6. Perfluoroalkylalkylmonocarboxylic acid esters according to claim 1, characterised in that each of R and R' denotes a perfluoroalkyl radical with seven to nine carbon atoms.

7. Perfluoroalkylalkylmonocarboxylic acid esters of the formula

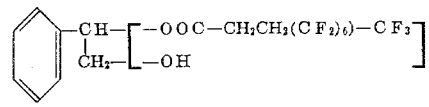

8. Perfluoroalkylmonocarboxylic acid esters of the formula

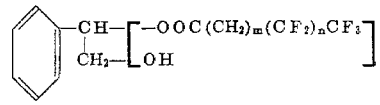

wherein m is 2, 4 or 6 and n is 5, 7, 9 or 11.

* * * * *